Sept. 13, 1932. T. M. CHANCE 1,876,533
METHOD FOR SEPARATING MATERIALS OF DIFFERENT SPECIFIC GRAVITIES
Filed Sept. 24, 1927
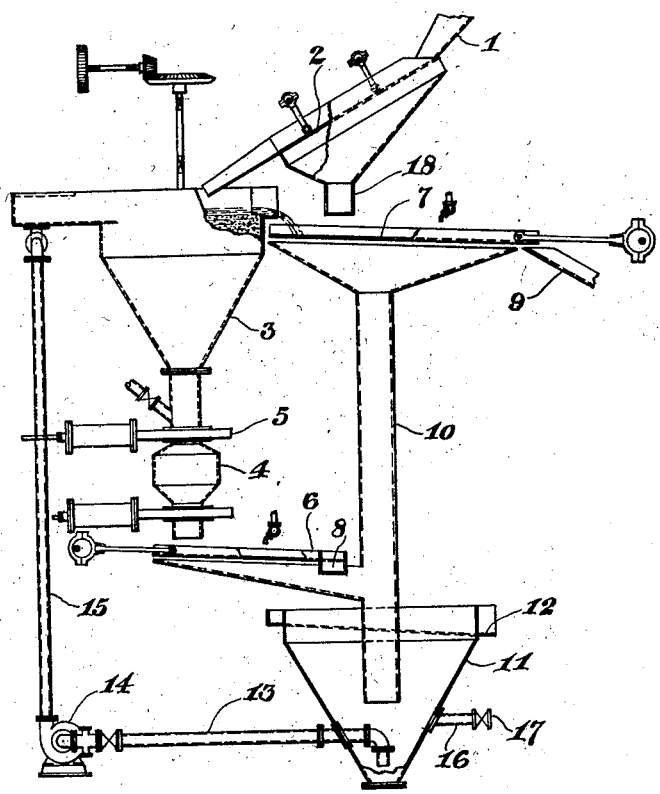
Witnesses:
Carl K. Schulze
Frank H. Mills
Inventor
Thomas M. Chance Patented Sept. 13, 1932

1,876,533

UNITED STATES PATENT OFFICE

THOMAS M. CHANCE, OF MERION, PENNSYLVANIA

METHOD FOR SEPARATING MATERIALS OF DIFFERENT SPECIFIC GRAVITIES

Application filed September 24, 1927. Serial No. 221,816.

My invention relates to the separation of coal from its impurities by the methods described in my United States Patents 1,224,138 and 1,392,401, now commonly known and hereinafter referred to as the sand flotation process. It especially relates to the removal from the fluid mass of fine material which will have a harmful effect upon the separating properties thereof. In Reissue Patent No. 16,674 various methods of discharging such fine material from the fluid mass are described and it is to the methods of operation and apparatus described therein that my present invention is particularly directed.

In the operation of the sand flotation process it is desirable that most of the finer coal be removed from the feed prior to its introduction into the separating fluid mass, as such fine coal of a size approaching that of the sand grains of said fluid mass cannot readily be separated by said process. However it is difficult to completely remove such finer coal from the feed and in addition a slight quantity thereof is produced by attrition during the operation of the process. It is therefore necessary to provide some means of removal and this has been accomplished by the use of fine screens, by separations that may be carried out hydraulically or by fluid mass flotation within the circuit, as disclosed in Reissue Patent No. 16,674, or by direct waste of some of the separating medium.

My present invention contemplates a different method of operation of the general apparatus used for the circulation of the sand and water in said Reissue Patent No. 16,674, the said apparatus being provided with certain adjunctive devices to permit such difference in method as illustrated by the accompanying drawing.

The drawing is a vertical elevation and partial cross-section of the general association of elements that may be used with my invention, employing a separating receptacle of the type described in my United States Patent 1,559,937. It will be understood that said drawing is diagrammatic and in carrying out my invention I may employ any desired type of separating receptacle, and means for removing the separated materials therefrom, that can be used for carrying out the sand flotation process.

The operation of my invention as shown by the drawing is as follows:

The raw coal to be cleaned is fed through chute 1 to fine coal screen surface 2 over which the material to be washed passes to separating receptacle 3, and through which the raw fines may be discharged to chute 18. Said receptacle 3 is provided with refuse discharge valves 5, of which there is an upper and a lower, separated by refuse chamber 4, refuse screen 6 and coal desanding and drainage screen 7. The washed coal passes over screen 7 to discharge chute 9 and the refuse over screen 6 to discharge chute 8, the sand and water recovered by these screens passing through conduit 10 to sand sump 11. The operation of this portion of the apparatus is similar to that of the apparatus described in United States Patent 1,559,937. My present invention has particularly to do with the sand sump 11. Said sand sump is provided with water overflow 12, sand return pipe 13, sand pump 14 and sand pump discharge pipe 15, these latter elements serving to respectively discharge the substantially sand-free water from the upper portion of said sand sump and a thickened mixture of sand and water from the lower portion thereof, the latter being then returned by pump 14 to the separating receptacle.

A discharge conduit 16 provided with valve 17 is located in the wall of said sand sump 11 at an elevation which is above the zone occupied by the sand contained in said sump when the circulation has ceased and the sand and water come to rest.

When coal is being washed by the apparatus, the total volume of water passing through screens 6 and 7, and conduit 10, to sand sump 11 consists of the sand pump water returned by pump 14 plus the extraneous water required for the operation of the system, such as that used for agitation, shaker screen wash water, etc. This total volume, intermixed with the sand returned by pump 14 from sump 11 and such fine coal as passes said screens, passes out of the base of conduit 10, causing violent agitation in the lower part of sump 11, and divides into two portions, the extraneous water rising upwardly in said sump and the sand pump water discharging into said pump 14 by suction pipe 13.

By proper proportioning of the apparatus, much of said fine coal will be carried into the upper portion of said sump by said extraneous water, such fine coal as does not discharge through the overflow 12 remaining in maintained suspension in said upper portion. That which is not so carried up passes with the sand and sand pump water to pump 14 and thence back to receptacle 3. Under such conditions valve 17 on conduit 16 is closed and no discharge occurs through said conduit.

If now the discharge through pipe 13 is reduced, either by slowing down said pump 14, or by throttling, the density in the lower portion of said sump 11 will increase due to the lessened agitation, the maximum effect occurring when said discharge completely ceases. This increased density results in a segregation of the fine coal in the upper part of the sand contained in sump 11 and this may be run off through conduit 16 and valve 17 with but little intermixed sand.

The best effect is produced when the discharge through pipe 13 is entirely interrupted and the extraneous water return reduced to a minimum. I have discovered that under these conditions, when the sand in the lower part of sump 11 completely settles, much of the fine coal is forced to the upper portion of the settled sand. The suspended fine coal in the upper part of said sump falls freely and forms a layer on top of the settled sand and it is then possible to draw off a practically sand-free fine coal product through conduit 16.

After such discharge of the accumulated fine coal, either following the reduction in the flow of conduit 13 alone or that of both conduit 13 and the extraneous water, the valve 17 is closed and the volume of flow through conduit 10 restored to the normal operating condition.

I have found that by the use of this intermittent method of fine coal removal it is possible to operate both anthracite and bituminous coal cleaning circuits without the special screens or other fine coal removing devices usually employed for maintenance of the desired operating conditions.

Such an intermittent method permits the fine coal to settle quiescently from the upper portion of the sand sump and in addition the very high densities occurring in the lower part of said sump as the sand contained therein comes to rest, directly displaces the coarser of the fine coal to the top of said sand, these ideal conditions being unattainable while the ordinary volumes of flow are in circulation.

It will be understood that while a single valved conduit 16 is shown on the drawing, a plurality of such conduits in a horizontal plane may be provided for drawing off the fine coal uniformly and that such conduits may also be placed at a number of vertical horizons to accommodate variations in vertical depth of the settled sand in sump 11. It will be further understood that a plurality of separating receptacles or sand pumps may be connected to a common sand sump and a plurality of sand sumps to a common receptacle or sand pump.

The drawing shows the general association of elements that may be employed with my invention, but it will be understood that the feed screen surface 2 is not a necessary adjunct to the operation of my present method.

While my invention is particularly designed for the cleaning of coal it will be understood that it may be applied to any materials separated by the processes described in said Patents 1,224,138 and 1,392,401, if said processes include circulation of portions of the separting medium.

By the term "fluid mass" I mean to include any mixture of comminuted solids and liquid which when properly agitated will approach the properties and fluidity of a true liquid; the term "water" is intended to mean any liquid suitable for making a fluid mass of the described type; and the term "sand" is intended to designate any comminuted solid, substantially insoluble in the liquid used and suitable for making a fluid mass of the described type.

By the expression "fine coal" or "fine material" I mean to include material which will have a harmful effect upon the separating properties of the fluid mass. In practice such material has been generally found to be that passing a $\frac{1}{16}''$ round hole screen. The size of such material is governed by both the type of sand used as a solid component of the fluid mass and also by the characteristics of the material itself.

Having described my invention, I claim,

1. A method of removing fine light materials from the constituents of a separatory fluid mass which consists in causing a volume of a gravity separating mixture of liquid and comminuted solids admixed with light materials and with liquid to fall as a stream of relatively small cross-sectional area from a higher to a lower level thereby developing relatively high velocity therein; in causing said stream to impinge into, to agitate and to prevent sedimentation of said solids and to maintain a portion of said fallen volume as a highly fluid agitated mixture; in causing a portion of the liquid constituent of said stream to flow upwardly through said agitated mixture to discharge the finer of said light materials therefrom and to maintain said agitated mixture diluted to a specific gravity below that of the coarser of said light materials, thereby maintaining said coarser light materials admixed through said mixture; in returning the remainder of said volume to said separatory fluid mass for reuse therein; in arresting said fall, said upward flow and said return, thereby causing said solids in said agitated mixture to settle into the lower portion of said mixture and come to rest, displacing the diluting liquid from said lower portion to the upper portion thereof; in causing said displaced liquid to eject said coarser admixed light materials from admixture with said solids to a locus above and apart from said settled solids; and in discharging said ejected materials, substantially free of said solids, from said locus.

2. The method of claim 1, and in permitting fine light materials raised by said upwardly flowing liquid constituent to settle into said locus and discharge with said coarser ejected light materials, after said arresting of said fall, said upward flow and said return.

3. A method of removing fine coal from the constituents of a separatory fluid mass which consists in causing a volume of a gravity separating mixture of water and comminuted solids admixed with fine coal and with water to fall as a stream of relatively small cross-sectional area from a higher to a lower level, thereby developing relatively high velocity therein; in causing said stream to impinge into, to agitate and to prevent sedimentation of said solids and to maintain a portion of said fallen volume as a highly fluid agitated mixture; in causing a portion of the water constituent of said stream to flow upwardly through said agitated mixture to discharge the finer of said coal therefrom and to maintain said agitated mixture diluted to a specific gravity below that of the coarser of said coal, thereby maintaining said coarser coal admixed through said mixture; in returning the remainder of said volume to said separatory fluid mass for reuse therein; in arresting said fall, said upward flow and said return, thereby causing said solids in said agitated mixture to settle into the lower portion of said mixture and come to rest, displacing the diluting water from said lower portion to the upper portion thereof; in causing said displaced water to eject said coarser admixed coal from admixture with said solids to a locus above and apart from said settled solids; and in discharging said ejected coal, substantially free of said solids, from said locus.

4. The method of claim 3, and in permitting fine coal raised by said upwardly flowing water constituent to settle into said locus and discharge with said coarser ejected coal, after said arresting of said fall, said upward flow and said return.

THOMAS M. CHANCE.